United States Patent
Wattron

(10) Patent No.: US 7,654,067 B2
(45) Date of Patent: Feb. 2, 2010

(54) MOWER-CONDITIONER EQUIPPED WITH FIRST AND SECOND HOLLOW ROLLERS WITH RELIEFS

(75) Inventor: Bernard Wattron, Haegen (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 11/697,446

(22) Filed: Apr. 6, 2007

(65) Prior Publication Data
US 2007/0234695 A1 Oct. 11, 2007

(30) Foreign Application Priority Data
Apr. 11, 2006 (FR) .................................. 06 51298

(51) Int. Cl.
*A01D 61/00* (2006.01)
(52) U.S. Cl. .................................................. 56/16.4 C
(58) Field of Classification Search ............. 56/16.4 C, 56/16.4 B, DIG. 1; 241/294, 895.2, 37, 232, 241/285.3
See application file for complete search history.

(56) References Cited

U.S. PATENT DOCUMENTS

| | | | |
|---|---|---|---|
| 2,075,448 A * | 3/1937 | Lundquist et al. ............. 460/34 |
| 3,273,976 A * | 9/1966 | Wogerbauer ................. 428/603 |
| 3,284,875 A * | 11/1966 | Wood .......................... 241/294 |
| 3,412,446 A * | 11/1968 | Wood .......................... 241/294 |
| 3,421,353 A * | 1/1969 | Franc ........................... 72/181 |
| 3,732,670 A * | 5/1973 | Milliken et al. .......... 56/16.4 C |
| 3,820,295 A * | 6/1974 | Folley .......................... 52/270 |
| 3,890,770 A * | 6/1975 | Milliken ................... 56/16.4 A |
| 3,940,966 A * | 3/1976 | Deane .......................... 72/196 |
| 4,075,822 A * | 2/1978 | Heckley et al. .......... 56/16.4 C |
| 4,089,324 A * | 5/1978 | Tjaden ........................ 126/666 |
| 4,290,255 A * | 9/1981 | Martenas ...................... 460/2 |
| 4,719,680 A * | 1/1988 | Cyron .......................... 29/890 |
| 4,807,339 A * | 2/1989 | Hayashi ....................... 492/24 |
| 4,807,645 A * | 2/1989 | Mietzel et al. ................. 460/32 |
| 4,821,494 A * | 4/1989 | O'Halloran et al. ....... 56/16.4 C |
| 4,896,483 A * | 1/1990 | O'Halloran et al. .............. 56/1 |
| 4,910,947 A * | 3/1990 | Seymour .................. 56/16.4 R |
| 4,914,909 A * | 4/1990 | Linde et al. ............... 56/16.4 C |
| 5,060,462 A | 10/1991 | Helfer et al. |
| 5,070,682 A * | 12/1991 | Bohman .................... 56/10.2 J |
| 5,094,063 A | 3/1992 | Wattron et al. |
| 5,107,663 A | 4/1992 | Wattron et al. |
| 5,142,848 A * | 9/1992 | Seymour .................. 56/16.4 C |
| 5,199,249 A | 4/1993 | Wattron et al. |
| 5,199,250 A | 4/1993 | Ermacora et al. |
| 5,241,784 A * | 9/1993 | Henry ......................... 47/66.1 |
| 5,280,696 A * | 1/1994 | Quataert et al. .......... 56/16.4 A |
| 5,306,890 A * | 4/1994 | Minamida et al. ...... 219/121.64 |

(Continued)

FOREIGN PATENT DOCUMENTS

CN 200939544 Y * 8/2007

(Continued)

*Primary Examiner*—Árpád Fábián-Kovács
(74) *Attorney, Agent, or Firm*—Oblon, Spivak, McClelland, Maier & Neustadt, L.L.P.

(57) ABSTRACT

A mower-conditioner conditioning roller comprising a superficial relief over the entirety of its periphery. This roller, of cylindrical overall shape, is hollow and has no cylindrical core and has a wall of reduced thickness directly comprising reliefs. The body of the roller is formed with at least one structured plate comprising reliefs obtained by bending or rolling.

14 Claims, 5 Drawing Sheets

U.S. PATENT DOCUMENTS

| | | | |
|---|---|---|---|
| 5,357,737 A | 10/1994 | Ermacora et al. | |
| 5,374,402 A * | 12/1994 | Hitachi et al. | 422/177 |
| 5,417,042 A | 5/1995 | Walch et al. | |
| 5,423,165 A | 6/1995 | Walch et al. | |
| 5,451,184 A * | 9/1995 | Mietzel | 460/32 |
| 5,522,208 A | 6/1996 | Wattron | |
| 5,562,304 A * | 10/1996 | Gest | 280/740 |
| 5,692,347 A * | 12/1997 | Hulek | 52/537 |
| 5,749,390 A | 5/1998 | Ermacora et al. | |
| 5,794,424 A | 8/1998 | Ermacora et al. | |
| 5,901,533 A | 5/1999 | Ermacora et al. | |
| 5,901,537 A | 5/1999 | Walch et al. | |
| 5,992,133 A | 11/1999 | Walch et al. | |
| 6,003,291 A | 12/1999 | Ermacora et al. | |
| 6,045,628 A * | 4/2000 | Solntsev et al. | 148/281 |
| 6,055,800 A | 5/2000 | Walch | |
| 6,085,501 A | 7/2000 | Walch et al. | |
| 6,101,796 A | 8/2000 | Wattron et al. | |
| 6,220,007 B1 * | 4/2001 | Doerr et al. | 56/16.4 C |
| 6,269,619 B1 | 8/2001 | Walch et al. | |
| 6,308,504 B1 | 10/2001 | Walch et al. | |
| 6,334,292 B1 | 1/2002 | Walch et al. | |
| 6,346,067 B1 | 2/2002 | Walters | |
| 6,381,935 B1 | 5/2002 | Wattron et al. | |
| 6,427,428 B1 | 8/2002 | Ermacora et al. | |
| 6,612,102 B2 | 9/2003 | Walch et al. | |
| 6,668,531 B2 | 12/2003 | Wattron et al. | |
| D512,077 S * | 11/2005 | Wuest et al. | D15/28 |
| D516,095 S * | 2/2006 | Wuest et al. | D15/28 |
| D520,526 S * | 5/2006 | Wuest et al. | D15/28 |
| 7,188,461 B2 * | 3/2007 | Fox et al. | 56/16.4 C |
| 7,322,175 B2 * | 1/2008 | Ferre et al. | 56/16.4 B |
| 2003/0078151 A1 * | 4/2003 | Weder | 493/463 |
| 2003/0110751 A1 * | 6/2003 | Rosenbalm et al. | 56/16.6 |
| 2005/0066619 A1 * | 3/2005 | McDonald | 52/782.1 |
| 2005/0106084 A1 * | 5/2005 | Maus et al. | 422/180 |
| 2006/0065770 A1 * | 3/2006 | Hausman et al. | 241/285.1 |
| 2006/0090443 A1 * | 5/2006 | Desnijder et al. | 56/16.4 A |
| 2006/0123759 A1 * | 6/2006 | Fox et al. | 56/16.4 C |

FOREIGN PATENT DOCUMENTS

| | | |
|---|---|---|
| DE | 19713160 A1 * | 10/1998 |
| EP | 1649742 A1 * | 4/2006 |
| FR | 2 390 083 | 12/1978 |

* cited by examiner

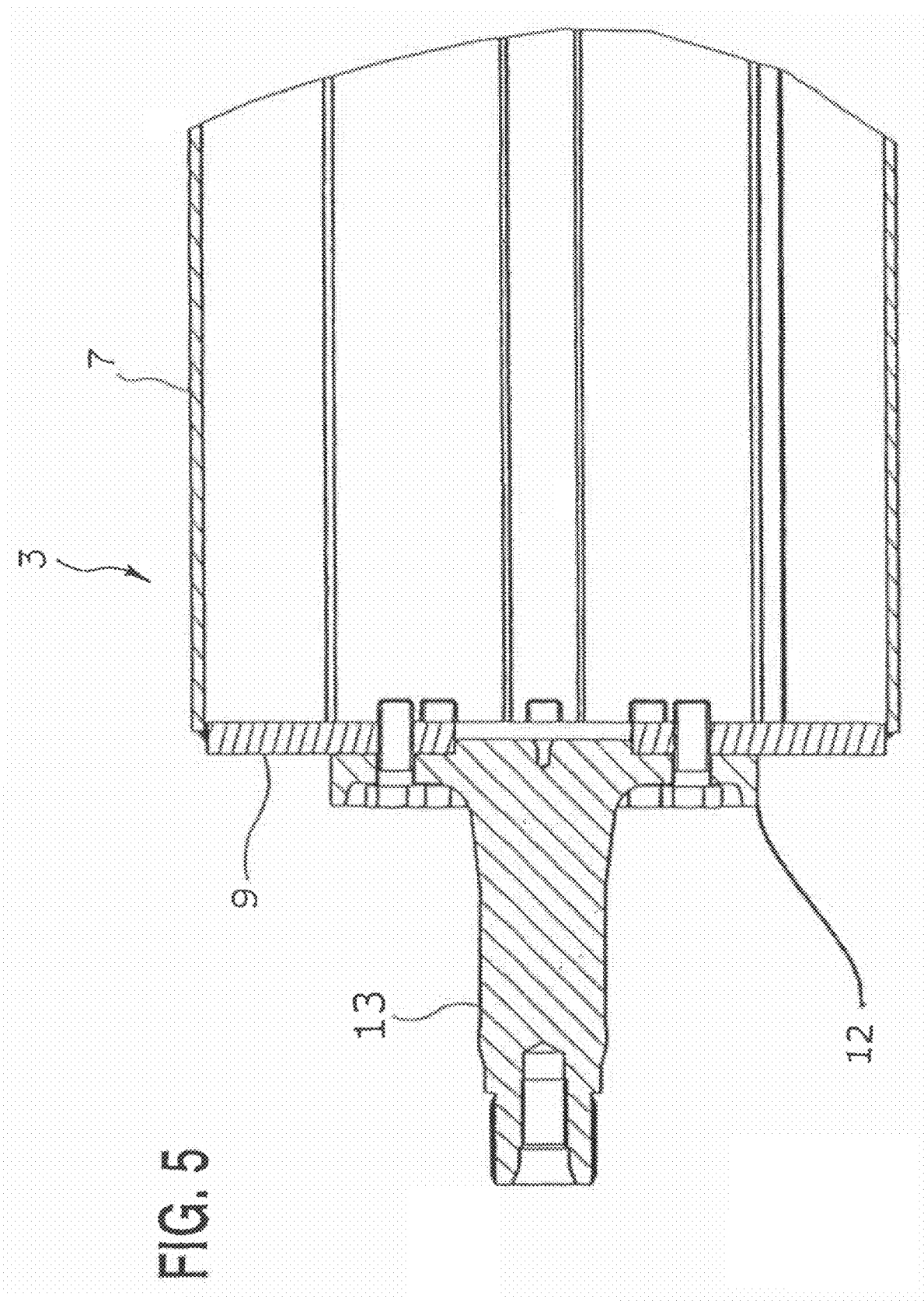

MOWER-CONDITIONER EQUIPPED WITH FIRST AND SECOND HOLLOW ROLLERS WITH RELIEFS

BACKGROUND OF THE INVENTION

1. Field of the Invention

The invention relates to a mower-conditioner conditioning roller, to a method of manufacturing such a roller and to a mower-conditioner equipped with such a roller.

Mower-conditioners comprise, in particular, a frame bearing a plant-cutting device and a device for conditioning the cut plants. This conditioning device is situated immediately after the cutting device. These mower-conditioners are hitched to the front or to the rear of agricultural tractors allowing to drive and move them.

The purpose of conditioning the forage is to reduce the length of time during which the harvest runs a risk of being damaged by rain. What conditioning actually allows is to reduce the overall drying time and to synchronize the stem and leaf drying.

Conditioning allows the protective film of plants to be broken open in order to increase the speed at which the plants dry and encourage uniform drying. Conditioning is highly effective when performed at the time of cutting.

The protective film is broken open by passing the plant between simple rollers or grooved rollers, the resulting squeezing bends or breaks open the strands of grass at intervals of 5-10 centimeters and may bruise the leaves. Thus, the purpose of conditioning is to process the forage to a certain extent in order to optimize drying, while at the same time limiting the degree of fragmentation and defoliation.

2. Discussion of the Background

Various roller-type conditioning systems exist, the main ones being:

roller conditioners where the rollers have a hard rubber covering, and roller conditioners where the rollers have steel sections.

Roller conditioners with rubber reliefs are known, for example, from patents FR 2 390 083 and U.S. Pat. No. 3,732,670. With this technique, the harvested products are conveyed into an inlet orifice formed between two conditioning rollers, these rollers having, on their exterior periphery, reliefs or protrusions lying a certain distance apart, the reliefs of one conditioning roller collaborating with depressions formed between the reliefs of the other conditioning roller.

Various relief designs have been developed to suit the plants that are to be conditioned, particularly for example for fragile plants such as clovers, alfalfas and, more generally, leguminous plants. In these devices, the intensity of the conditioning operation is also regulated by varying the pressure with which the rollers are pressed together.

These rubber roller conditioners consist of a cylindrical core to which the rubber covering is added. These rollers are very expensive to manufacture and have a fairly short life.

Conditioners comprising rollers with metal section pieces have been described, for example, in document U.S. Pat. No. 6,346,067. These conditioners have an improved service life but display several drawbacks particularly as a result of the difficulty experienced in producing satisfactory reliefs and in the industrial-scale manufacture of high-performance rollers at a reasonable cost.

Because of the difficulty there is in obtaining metal sections specially suited to this application, the effectiveness of the conditioning of plants of various kinds with such rollers is somewhat uncertain.

The high weight of the known rollers in mower-conditioners also presents a problem, especially as machines are becoming increasingly wide which means that more robust and therefore more expensive support means are required.

SUMMARY OF THE INVENTION

The objective of the invention is therefore to solve these main difficulties by proposing a new category of mower-conditioner conditioning rollers, which can easily be manufactured on an industrial scale, at lower cost, and with a long life.

The present invention relates to a mower-conditioner conditioning roller comprising a superficial relief over the entirety of its periphery, which roller, of cylindrical overall shape, is hollow and has a wall of reduced thickness directly comprising reliefs, said roller in fact having no cylindrical core. The body of the roller is formed with at least one structured plate comprising reliefs obtained by bending or rolling. The reliefs may be angular and numerous over the entire periphery in order to obtain intensive conditioning.

The invention advantageously makes it possible to produce metal rollers which have a long life, with varied reliefs, these rollers being particularly well-suited to optimal conditioning of plants after cutting.

The controlled deformation of a plate makes it possible to obtain a cylinder with reliefs, of a weight that is reduced as far as possible because only that part which is of use in conditioning the plants is manufactured. This is a marked advantage over existing rollers that have structures with elements added to cylinders to form the reliefs.

The low weight of the conditioning rollers according to the invention allows a reduction in the weight of the machines using them and also in the energy deployed for working in the fields.

The rollers according to the invention are simple to manufacture, and can be manufactured using a minimum amount of material; the cost of manufacture is therefore significantly lower by comparison with existing rollers and with known methods of producing these rollers.

BRIEF DESCRIPTION OF THE DRAWINGS

Other features and advantages of the invention will become apparent from the description which will follow with reference to the attached drawings which are given merely by way of nonlimiting examples.

FIG. 5 shows a cross-section of one example of an inventive roller connected to an external shaft.

DESCRIPTION OF THE PREFERRED EMBODIMENTS

Figure 1:
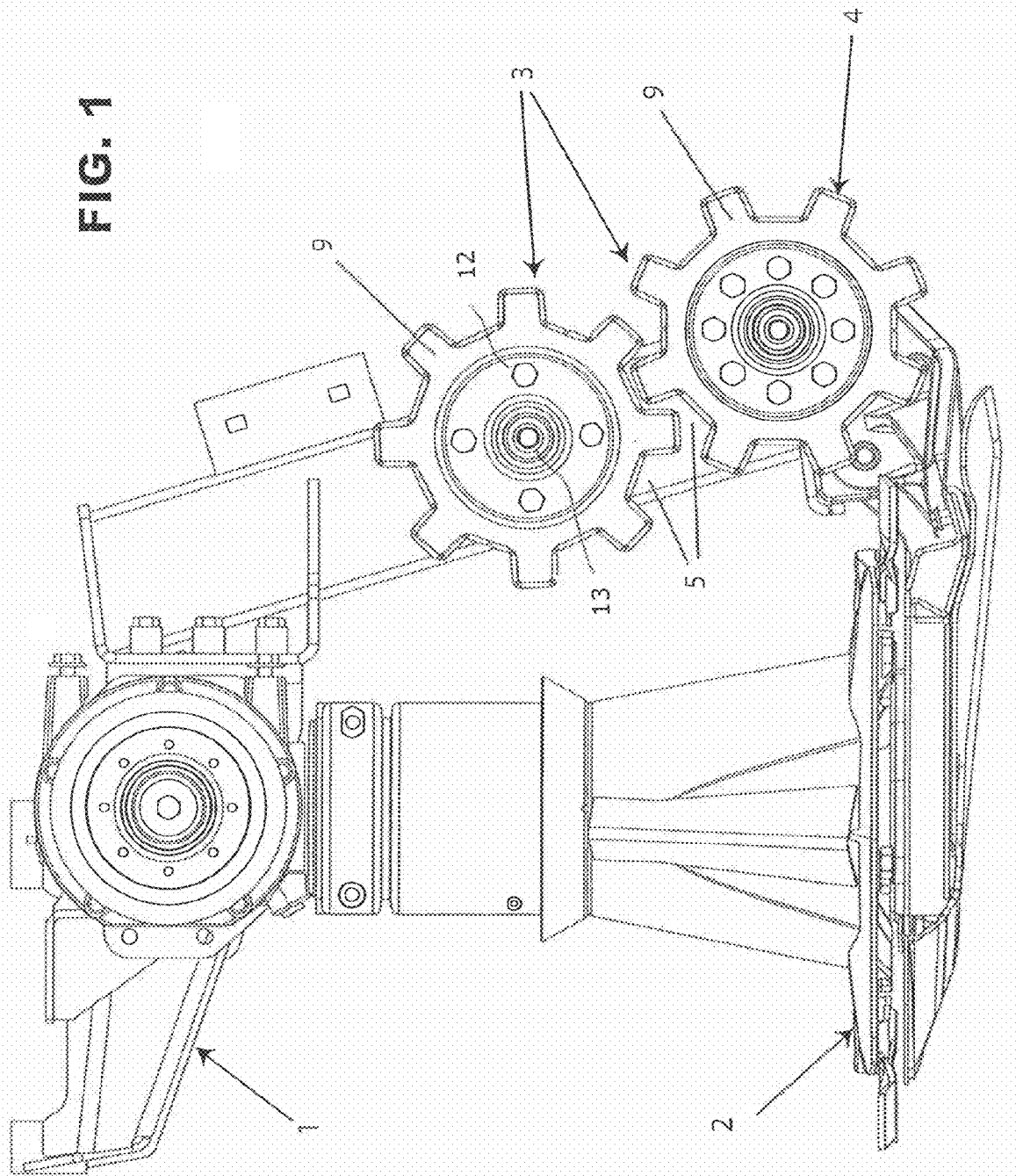
FIG. 1 shows a section through a machine with a cutter bar, to the rear of which two rollers according to the invention are positioned.

As shown in FIG. 1, the mower-conditioner is made up of a frame 1 that can be connected to a tractor and bears the cutter bar 2, two substantially identical conditioning rollers 3 and drive means driven off the tractor. The conditioning rollers 3 according to the invention may be situated immediately after a cutter bar 2.

Each conditioning roller 3 is of cylindrical overall shape and is hollow. It comprises a wall made of plate of reduced thickness with reliefs 4 over the entirety of its periphery. The roller 3 thus has no internal cylindrical core and the roller 3 typically includes a bolt pattern 12. The bolt pattern 12 attaches shaft 13 to the outside of the roller 3.

These rollers 3 are provided with reliefs 4 and are configured to work together, in synergy, to process the plants by passing these plants between them toward the rear end of the machine. Advantageously, the reliefs 4 of one conditioning roller 3 collaborate, in the manner of gear teeth, with depressions 5 formed by the reliefs 4 of the other conditioning roller, as illustrated in FIG. 1.

The rollers 3 are driven in rotation in such a way as to turn in a converging manner at the front, and may comprise means for adjusting the conditioning parameters as conventionally employed on other categories of conditioning rollers, such as for example clamping means for controlling the spacing between the rollers 3.

The means for adjusting the intensity with which the plants are conditioned using the conditioning rollers 3 according to the invention are identical to the known conventional systems, particularly those which act on the pressure between the rollers 3.

Figure 2:
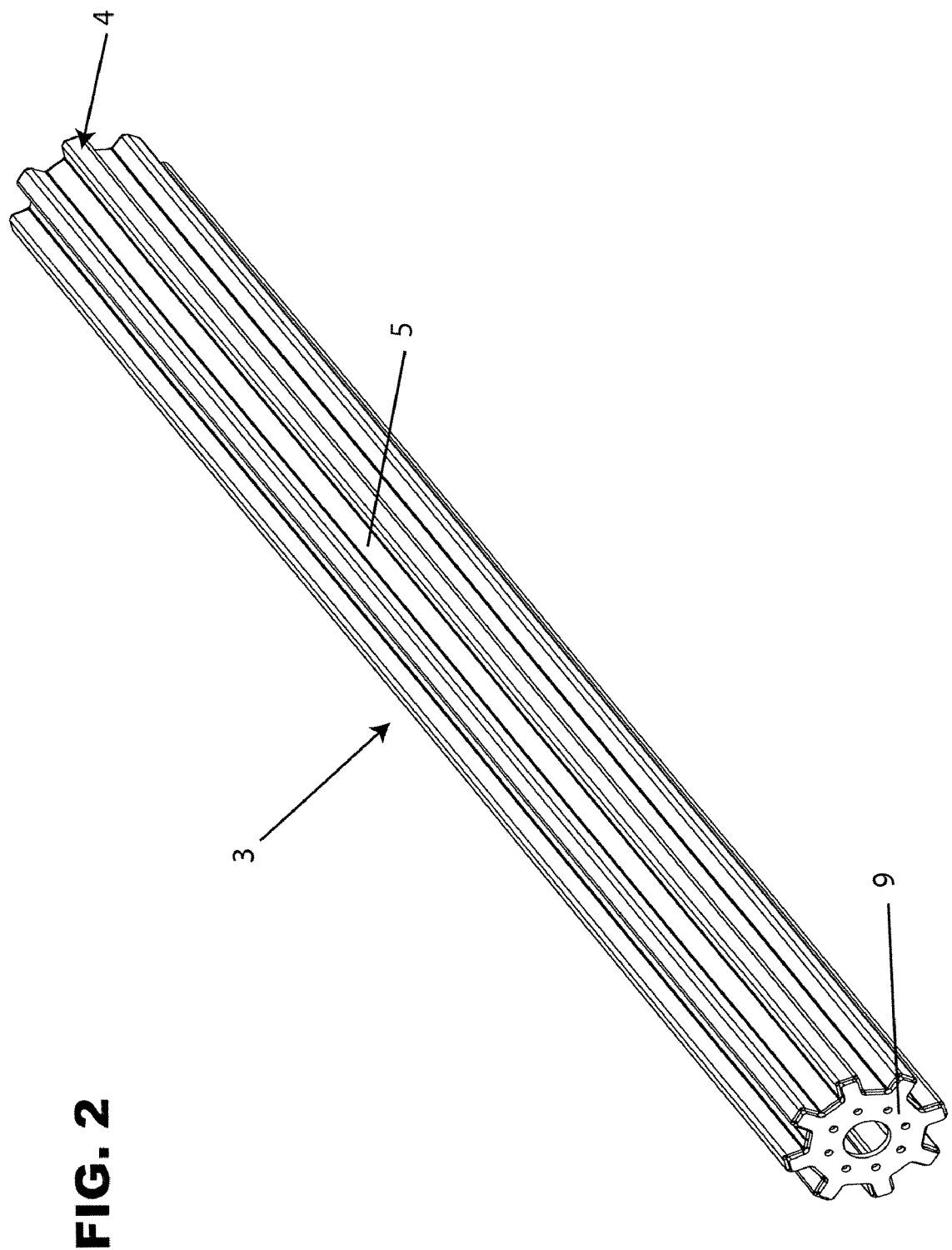
FIG. 2 is a perspective view of a roller according to the invention.

FIG. 2 illustrates a conditioning roller 3 according to the invention in which the body of the roller is formed with at least one plate comprising reliefs 4 which are obtained by bending or by rolling, the entirety being structured in such a way as to form a cylindrical overall shape.

Advantageously, the reliefs 4 are provided to be of a square or rectangular (FIG. 3) or a triangular (FIG. 4) shape with relatively sharp edges for optimized plant-conditioning effectiveness. The number of these reliefs 4 is comprised between six and ten on each roller 3. With a high number of reliefs 4 the plants are subjected to more impacts as they pass between the rollers 3, thus increasing the intensity of the conditioning.

The reliefs 4 on the conditioning roller 3 are formed along the entire length of the cylinder, as depicted in FIG. 2. The reliefs 4 correspond to ribs made in the plate which may be flat at the beginning.

According to the invention, the roller 3 therefore comprises at least one structured plate, that is to say a plate that has been deformed using techniques known in the art, for example by rolling or bending, shaped into a portion of a cylinder or into a full cylinder, in order, ultimately, once the ends have been welded together or various parts have been joined together, to form a closed cylinder having a relief over the entirety of its periphery.

Thus, it is conceivable to produce a cylinder using a single structured plate 6 shaped into a cylinder with the plate welded together along its two long sides, that is to say along the length of the cylinder formed, or to join together various plates 7 and 8, shaped into portions of a cylinder, advantageously two half-cylinders, to form the full cylinder.

Closing the plate up on itself or joining various plates together is an operation that preferably uses welding, although other means may be used without departing from the scope of the invention.

Once the structured plate has been manufactured by rolling or bending, the cylinder is closed at its two lateral ends by end-plates 9 which have a shape practically identical to that of the cross section of the cylinder.

The end-plates 9 are provided with the means needed for arranging and securing the rollers 3 on the frame 1 and connecting them to the parts which drive their rotation during work.

Advantageously, the two end-plates 9 are also welded to the lateral ends of the cylinder.

There are many conceivable reliefs 4 that the conditioning rollers 3 might have. It has been found to be particularly advantageous to produce reliefs 4 with a square or rectangular cross section, as illustrated in FIG. 3, or with a triangular shape as depicted in FIG. 4; rough profiles may allow the intensity of the conditioning to be increased.

It is conceivable for the reliefs 4 on the rollers 3 and the conditioning intensity adjustment to be adapted so as to suit the type of plant to be treated.

Figure 3:
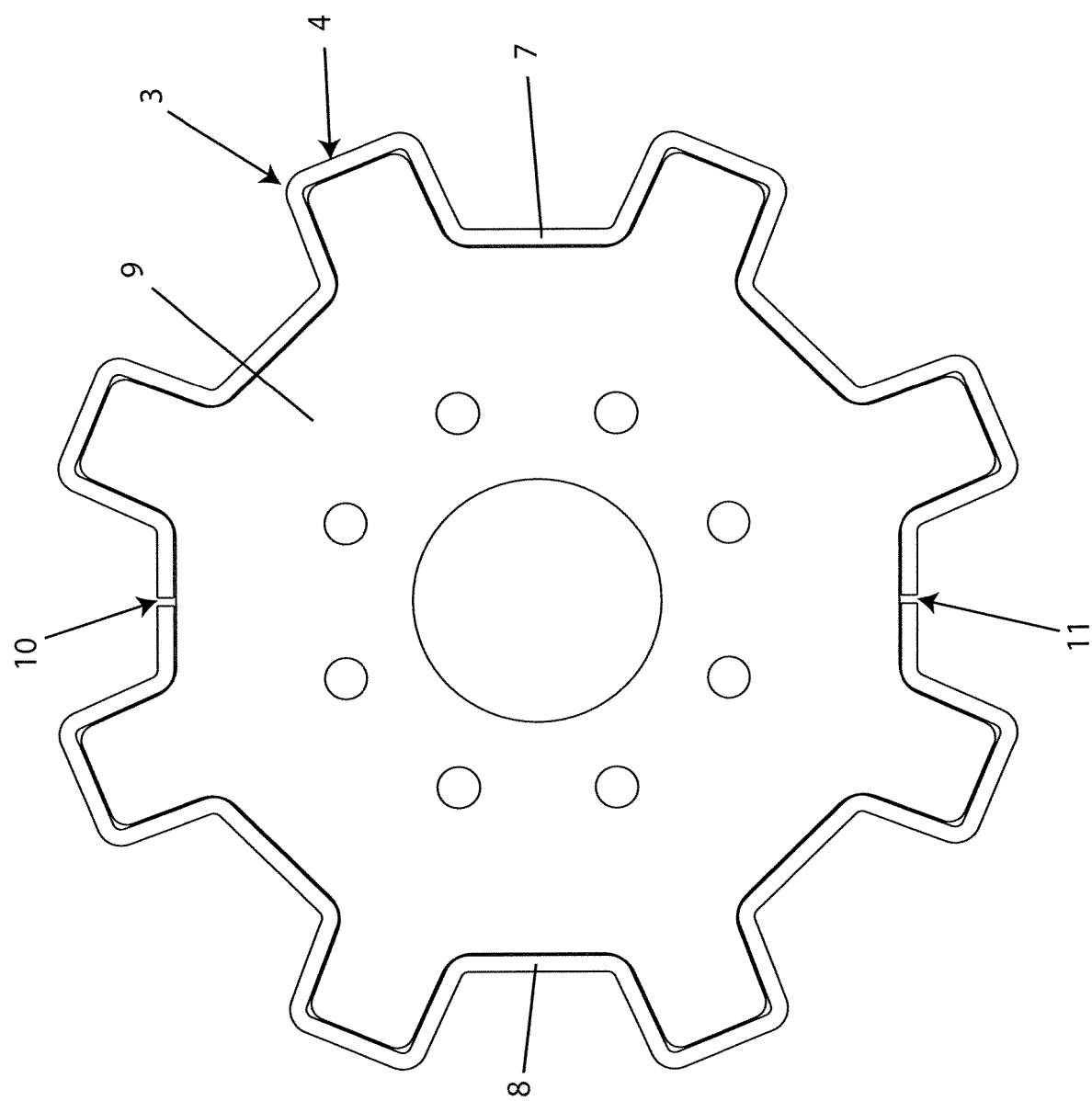
FIG. 3 illustrates a cross section of a roller with square-profile or rectangular-profile ribs.

FIG. 3, which illustrates a profile with square or rectangular reliefs 4 also shows the configuration of two plates 7 and 8, shaped as two symmetric half-cylinders, welded along the seams 10 and 11 to form a full cylinder.

Figure 4:
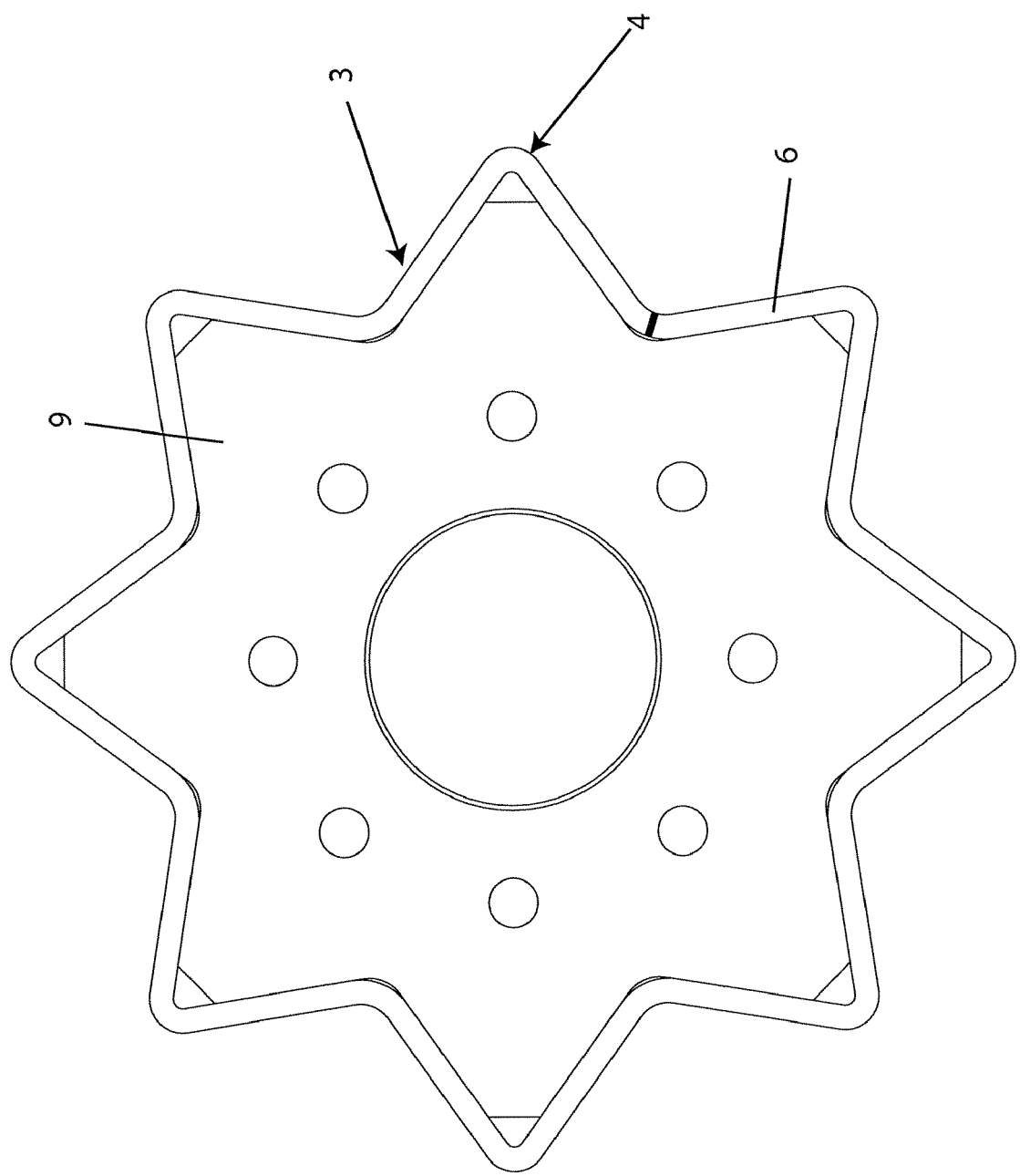
FIG. 4 shows a cross section of a roller with triangular-profile ribs.

FIG. 4 illustrates a type of roller 3 comprising triangular reliefs 4. As with the other conceivable reliefs, the protrusions 4 on one roller 3 nest in the depressions 5 of a substantially identical roller 3, so as to form a pinching or crushing zone making it possible to condition the cut plants originating from the cutter bar 2.

The invention also relates to a method of manufacturing a mower-conditioner conditioning roller 3 wherein:
  a cylinder with reliefs 4 is manufactured by simply rolling or bending at least one plate,
  said cylinder is joined to two end-plates 9 to close off its lateral ends.

Advantageously, according to the invention the plate is structured during rolling or bending and closed up by welding it together or to a symmetric plate so as to form a closed cylinder having square, rectangular or triangular reliefs at the surface over the entirety of its periphery.

There are several possible alternative forms that the conditioning roller 3 described earlier may take: in particular, there are various constituent metals of which it may be made, and also, as has already been mentioned, various reliefs may be produced, without departing from the scope of the invention.

The cylinder may be formed by joining together one, two or more plates 6, 7, 8 in various ways, not only by welding, although that seems less favorable, without departing from the scope of the invention.

The dimensions of the roller 3, the depth of the reliefs 4 and the way in which various conditioning rollers 3 nest together can vary widely without departing from the scope of the invention.

The invention also relates to a mower-conditioner comprising a frame 1, a cutter bar 2 and conditioning rollers 3 produced as described hereinabove.

Of course, the invention is not restricted to the embodiments described and depicted by way of examples, but also comprises any technical equivalents and combinations thereof.

What is claimed as new and desired to be secured by Letters Patent of the United States is:

1. A mower-conditioner comprising:
  a frame supporting a plant-cutting device; and
  a conditioning device configured to condition plants cut by the plant-cutting device, the conditioning device including
    first and second hollow conditioning rollers configured to press the plants cut by the plant-cutting device, each roller including a wall defining reliefs over an external periphery of the respective roller, an internal surface of the wall being exposed to an axis of rotation of the respective roller, and first and second end-plates disposed on opposite ends of each of the first and second rollers, respectively, a cross-section of the wall of each roller taken along an axis of rotation of the conditioning roller having a uniform thickness, around a circumference of the roller, extending from an outermost surface of the first end-plate along the axis of rotation to an outermost surface of the second end-plate along the axis of rotation, the first and second rollers each being without an internal shaft.

2. The mower-conditioner as claimed in claim 1 wherein the end-plates are welded to the opposite ends of the first and second rollers.

3. The mower-conditioner as claimed in claim 2, wherein the wall of each roller is made of structured plate including the reliefs, the reliefs including a bent shape.

4. The mower-conditioner as claimed in claim 3, wherein the reliefs are of rectangular or square shape.

5. The mower-conditioner as claimed in claim 3, wherein the reliefs are of triangular shape.

6. The mower-conditioner as claimed in claim 2, wherein the reliefs have relatively sharp edges.

7. The mower-conditioner as claimed in claim 2 further comprising six to ten reliefs over the entirety of a periphery of at least one of the first and second rollers.

8. The mower-conditioner as claimed in claim 3, wherein the structured plate includes a welded seem along a length of the at least one roller and is bent.

9. The mower-conditioner as claimed in claim 3, wherein the each of the first and second rollers includes several bent and partially cylindrically-shaped structured plates welded to one another along their longest sides to form a shape that is overall cylindrical for each of the first and second rollers.

10. The mower-conditioner as claimed in claim 1, wherein the first and second end-plates are welded to the opposite ends of the first and second rollers, and each of the first and second rollers includes at least one bent or rolled structured plate.

11. The mower-conditioner as claimed in claim 1, wherein the first and second end plates include a bolt-hole pattern.

12. The mower-conditioner as claimed in claim 1, wherein the first and second end-plates have a profile matching a profile of an interior surface of the roller as viewed along an axis of rotation of the roller.

13. The mower-conditioner as claimed in claim 1, wherein the wall of each of the first and second rollers has a uniform thickness along the entire periphery of the first and second rollers, respectively;

wherein the end-plates of each of the first and second rollers have a profile matching a profile of an interior surface of the each of the first and second rollers as viewed along an axis of rotation of the roller, and wherein each of the first and second rollers is configured to be supported solely by the first and second end-plates.

14. The mower-conditioner as claimed in claim 1, wherein outermost portions of the reliefs of each of the first and second rollers define an overall cylindrical shape.

* * * * *